J. A. HAMRICK.
Corn Planter.
No. 96,586.
Patented Nov. 9, 1869.
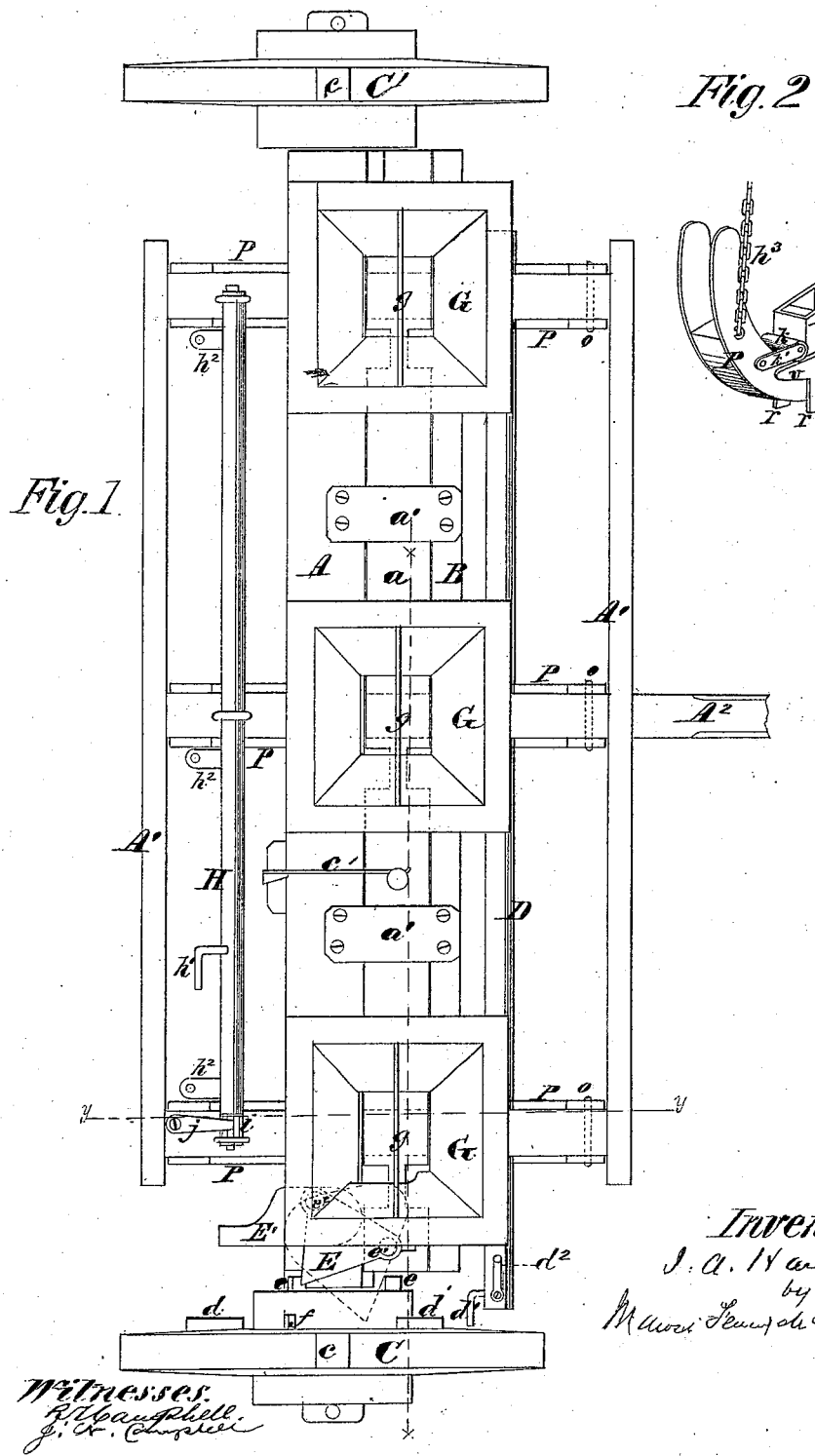
Inventor
J. A. Hamrick
by
Munn Semple & Lanman
Witnesses.

J. A. HAMRICK.
Corn Planter.
No. 96,586. Patented Nov. 9, 1869.
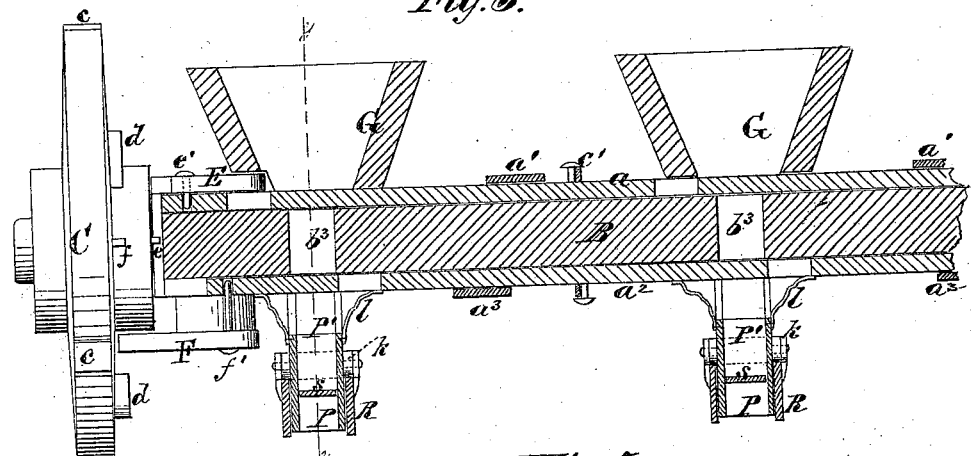
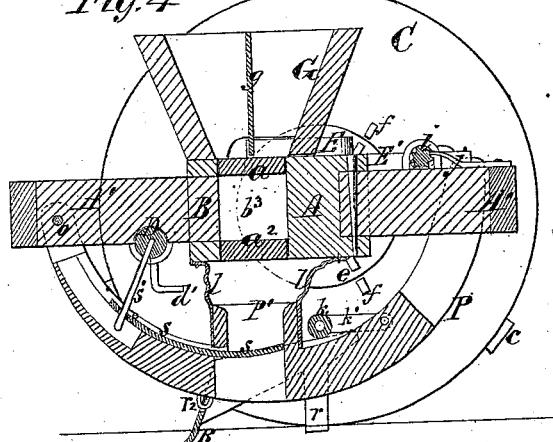
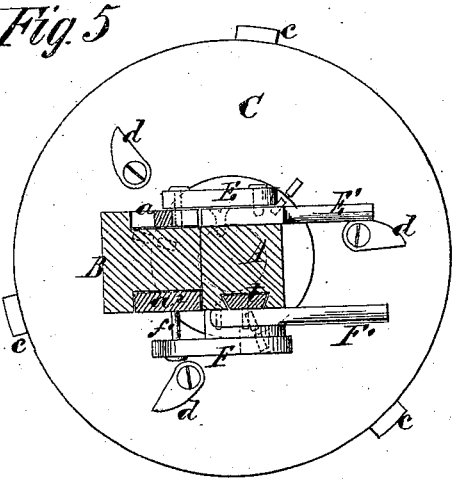
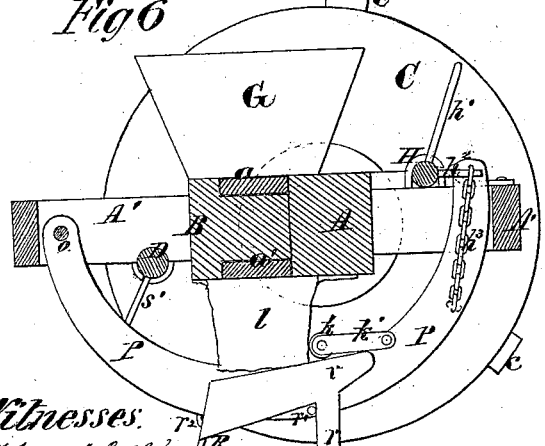
Witnesses: Inventor:

United States Patent Office.

JAMES A. HAMRICK, OF PARNASSUS, VIRGINIA.

Letters Patent No. 96,586, dated November 9, 1869.

IMPROVEMENT IN CORN-PLANTERS.

The Schedule referred to in these Letters Patent and making part of the same.

To all whom it may concern:

Be it known that I, JAMES A. HAMRICK, of Parnassus, in the county of Augusta, and State of Virginia, have invented a new and improved Corn-Planter; and I do hereby declare that the following is a full, clear, and exact description thereof, reference being had to the accompanying drawings, making part of this specification, in which—

Figure 1, plate 1, is a top view of the machine, with the covers removed from the hoppers, and a portion of the draught-pole broken off.

Figure 2, plate 1, is a perspective view of one of the adjustable runners, with the opening-tooth and coverers attached to it.

Figure 3, plate 2, is a vertical section taken through one-half of the machine, in the plane indicated by dotted line $x$ $x$ in fig. 1.

Figure 4, plate 2, is a cross-section taken through the machine, in the vertical plane indicated by dotted lines $y$ $y$ in figs. 1 and 3.

Figure 5, plate 2, is a cross-section through the machine, taken in the vertical plane indicated by dotted lines $z$ $z$ in figs. 1 and 3.

Figure 6, plate 2, is a cross-section through the machine, taken in the vertical plane indicated by dotted lines $z'$ $z'$ in figs. 1 and 3.

Similar letters of reference indicate corresponding parts in the several figures.

This invention relates to certain novel improvements on corn-planters which are adapted for check-rowing and planting corn and its fertilizer in hills, at regular intervals apart.

The nature of my invention consists, first, in the application to one side of the axle of two transporting-wheels, of a perforated beam, which is grooved on its top and bottom, for receiving two reciprocating double-perforated slides, one of which discharges the seeds and the fertilizer from the hoppers into the perforations or cells through the said beam, and the other discharges the seeds and fertilizer from said cells into chambers formed in vertically-adjustable segmental runners, and in applying to said runners reciprocating slides, which will receive upon them and momentarily retain the seeds and fertilizer, at points very near the ground, and then discharge the seeds and fertilizer into the drills, without scattering, as will be hereinafter explained.

Second, in adjustable cams applied to the axle of the transporting-wheels, connected to the seed-slides, and provided with handles for moving them into and out of operation, said cams being arranged, when adjusted for operation, so as to be acted upon alternately by studs on one of the transporting-wheels, and thus communicate to the said slides reciprocating motion, as will be hereinafter explained.

Third, in vertically-adjustable runners, which are of the form of segments of a circle, and which are pivoted at their front ends to the frame of the machine, and guided and stayed at their rear ends by said frame, said runners being suspended from an adjusting-bar, by means of chains attached to their rear ends, so that the attendant can raise them free from the ground at pleasure, and said runners being provided with adjustable teeth and coverers, for opening the ground to receive the seed, and covering the seed after it is dropped, as will be hereinafter explained.

Fourth, in providing a rolling or self-adjustable weight, for holding the teeth to their work, but allowing these to yield backward, should they meet with an object in their path which would be liable to break them, or derange the machine, as will be hereinafter explained.

Fifth, in a reciprocating slide or cut-off, applied to a segmental vertically-adjustable runner, through which the seeds are dropped, and moved in the arc of a circle, for alternately cutting off and effecting the discharge of the seeds, as will be hereafter explained.

To enable others skilled in the art to understand my invention, I will describe its construction and operation.

In the accompanying drawings—

A represents the axle of two transporting-wheels, C C', which latter have elevations, $c$, on their peripheries, arranged at such distances apart as will mark the spots where the seeds are deposited in the ground, so that the attendant can guide the machine by these marks, and thereby plant the seeds at regular distances apart.

To the front side of the axle A, and rigidly secured thereto, is a beam, B, through which passages $b^3$ are made, vertically, for receiving the seed and fertilizer as they fall from the hoppers G.

The machine shown in the drawings, fig. 1, has three hoppers G, arranged at regular distances apart on top of the beam B, and beneath each hopper is one of the passages $b^3$, as shown in figs. 3 and 4.

The beam B is grooved longitudinally on top and bottom, and in these grooves the slides $a$ $a^2$ are applied so that they can be moved freely.

These slides are in the vertical plane of the passages $b^3$, and they have perforations through them, arranged in pairs, for allowing both the seeds and the fertilizer to drop, first from the hoppers into the passages $b^3$, upon the lower slide $a^2$, thence to drop from said passages into receptacles P', of segmental runners P, upon slides $s$.

Each hopper G is divided by a partition, $g$, which forms two apartments, one for corn and the other for a fertilizer, which it is desired to drop with the corn.

The upper slide $a$ is moved in one direction far enough to discharge from the hoppers the proper quantity of corn and fertilizer into the passages $b^3$, upon the lower slide $a^2$, by means of a triangular cam-plate, E, and studs $e$, upon the inner end of the transporting-wheel C.

The cam E is pivoted, at its rear inner corner, to a vibrating hand-lever, E', which is pivoted to the top of axle A, and extended backward, as shown in figs. 1 and 5; and the front corner of this cam E is connected to the slide $a$, by means of a pin, $e'$, which plays freely in an oblong slot made through the slide $a$.

The slide $a$ is held in the position indicated in figs. 1 and 3, by means of a spring, $c'$, which will quickly return the slide into this position after each movement of the cam.

The slide $a^2$ is moved in one direction, to effect the discharge of the seed and fertilizer from the passages $b^3$, by means of vibrating triangular cam F, which is acted upon by studs $f$, on one side of wheel C.

A spring, corresponding to spring $c$, operates to return slide $a^2$ to a position for cutting off after each discharge.

The cam F is pivoted at its rear corner to the axle A, and connected, by a pin, $f'$, to the slide $a^2$, precisely as described for connecting cam E to slide $a$.

The studs $e$ and $f$ are arranged upon wheel C, so as to alternately move the slides $a$ $a^2$, and thus effect the dropping of the seeds and fertilizer by stages, from a higher to a lower level.

The cross-strips $a^1$, and top of the axle and beam, hold the slide $a$ down in place, but allow it to receive free endwise movement, and the strips $a^3$, on the bottom of the axle and beam, keep the slide $a^2$ in its place, but allow it to be moved freely in a direction with its length.

When the seeds and fertilizer are allowed to fall from the passages $b^3$, they are received into receptacles P', formed in runners P, and are momentarily arrested therein by slides $s$, which are located so near the surface of the ground that the seeds and fertilizer will not be scattered while falling from the receptacles P' into the furrows made by teeth R.

The receptacles P' are formed at the middle of the length of segmental runners P, which runners are pivoted, at $o$ $o$ $o$, to the front longitudinal beams of frame A', and suspended at their rear ends by means of chains, $h^3$, which are attached to short arms, $h^2$, fixed to a rock-shaft, H.

This shaft H is prevented from turning backward by a pawl, $j$, engaging with teeth $i$, which are formed on this shaft, as shown in figs. 1 and 4.

By means of the lever $h^1$, which rises from shaft H, the attendant can turn the latter partly around, and thereby raise the rear ends of all the runners simultaneously, and by disengaging the pawls $j$ from teeth $i$, the runners may be depressed.

Each runner P is of a segmental form, and has its convex side presented to the ground. Its ends are forked, to receive between them the front and rear longitudinal beams of frame A, and it has a passage through it, at the middle of its length, through which the seeds and fertilizer fall when the slide $s$ is moved forward.

The segmental slide $s$, of each runner P, is suitably guided on top of this runner, and receives loosely through its front end the free end of an arm, $s'$, which is fixed to a horizontal rock-shaft, D, as shown in fig. 4.

The shaft D extends out from one end of its sustaining-frame A', and has a stirrup, $d'$, (see fig. 1,) secured to it, in such a position as to be struck by the cam-faced lugs $d$, on the inner side of wheel C.

The slide $s$ is in this manner moved forward, so as to effect the discharge of the seeds and fertilizer into the ground.

The arms $s'$ should be made long enough to move their slides $s$ when the runners are fully depressed.

The flexible tubes $l$ $l$ $l$ guide the seeds and fertilizer while falling from the passages $b^3$ into the receptacles P'.

The teeth R, which form furrows or drills in the soil to receive the seeds, are pivoted, at $r^2$, to the bottoms of the runners.

Each tooth R is constructed with side-wings, U, from which depend two coverers, $r$ $r$, for scraping the earth loosely over the seeds.

The teeth R are held down in working position by means of rolling weights, $k$, which rest upon the upper edges of the wings U, and which are connected to arms, $k'$ $k'$, that are pivoted to the sides of the runners.

The weights $k$ should be sufficiently heavy to keep the teeth down to their work under ordinary circumstances, but not so heavy as to prevent the teeth from yielding backward, should they meet with undue resistance.

It will be seen, from the above description, that the seeds and fertilizer are discharged from the three hoppers, and momentarily arrested in the vertical passages $b^3$, by the slide $a^3$; also, that the seeds and fertilizer are again arrested in chambers P', by the slide $s$, thereby allowing the seeds and fertilizer of each charge to be deposited at one point in the drill, and preventing the charges from being scattered.

It will also be seen that I employ runners, P, which will rise and descend, and accommodate themselves to inequalities of surface passed over, and which will not be liable to gather weeds and trash, and which will serve as a means of attaching the teeth R to the machine.

It will also be seen that the cam E can be adjusted by means of handle E', so that the lugs $e$ will not strike it.

The cam F', which is pivoted to slide $t$, as shown in fig. 5, can be similarly adjusted by means of its lever F', which is pivoted to a slide, $t$.

In the fertilizer-department of the hoppers, rotary or oscillatory stirrers may be arranged, and operated by the upper seed-slide.

I prefer to employ a stirrer consisting of a post, having radial arms fixed to it, and carrying on one end a toothed wheel, which will engage with a rack on the seed-slide.

Such a stirrer will agitate the fertilizer, and cause it to flow freely during the operation of the machine.

Having described my invention,

What I claim as new, and desire to secure by Letters Patent, is—

1. The construction of axle A, with a vertically-perforated and horizontally-slotted beam upon one side, substantially as and for the purposes described.

2. Slides $a$ $a^2$, cam-plates E F, levers E' F', and springs $c$, combined and operating substantially as described.

3. The levers E' F', applied to their respective cams, E F, and to the axle A, substantially as described.

4. Segmental runners P, applied to the machine, and constructed substantially as described.

5. The segmental slides $s$, applied to runners P, and operated by lugs $d$, on wheel C, acting through the medium of arms $s$, shaft D, and stirrup $d'$, substantially as described.

6. The rolling weights $k$, applied to rear extensions of the teeth R, substantially as and for the purposes described.

7. The combination, in a seeding-machine, of the slides $a$ $a^2$ and $s$, arranged and operating as set forth.

JAMES A. HAMRICK.

Witnesses:
P. B. HOGSHEAD,
W. C. HEDRICK.